(No Model.)
R. R. ZELL.
STEAM BOILER.
No. 437,274.      Patented Sept. 30, 1890.
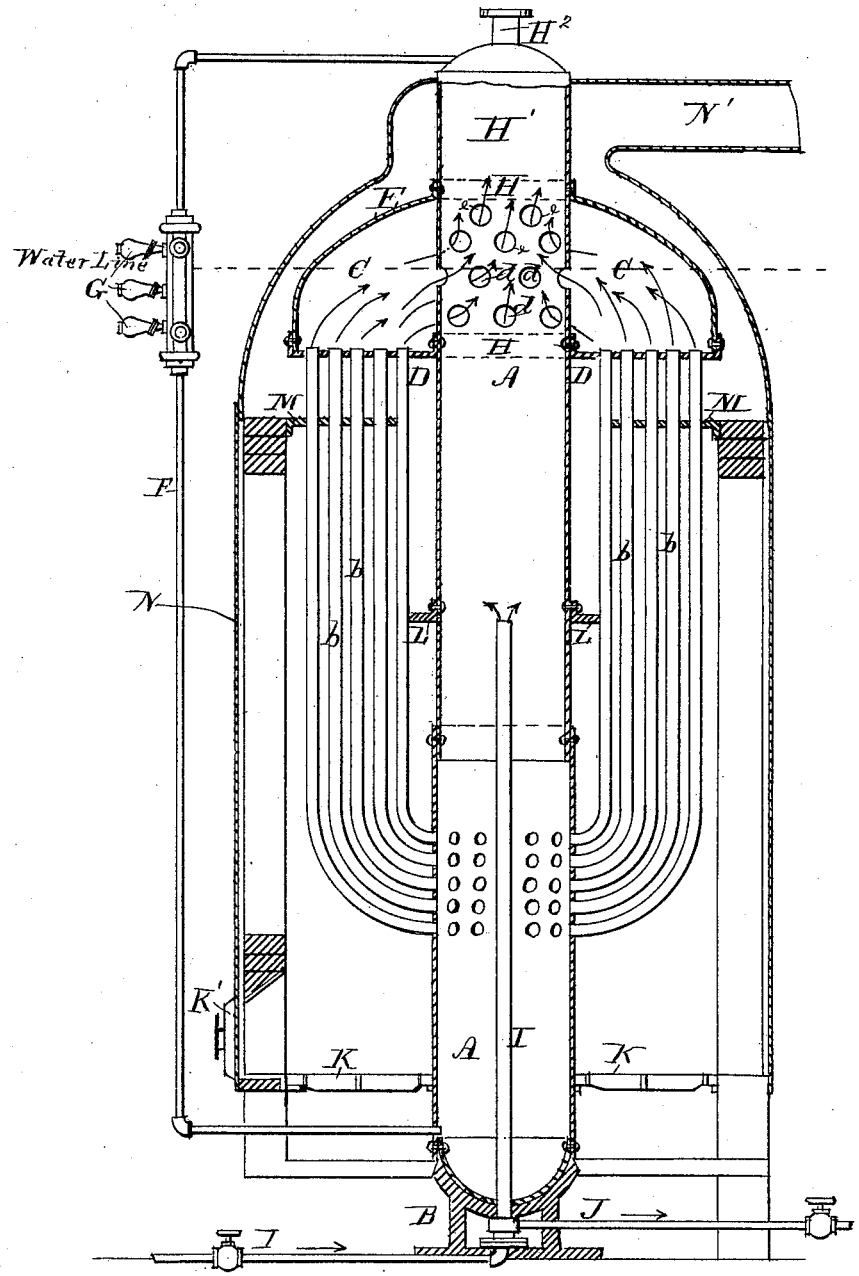
WITNESSES
INVENTOR
Robert R. Zell
By his attorney
J. Stewart Rusk

UNITED STATES PATENT OFFICE.

ROBERT R. ZELL, OF BALTIMORE, MARYLAND, ASSIGNOR TO THE CAMPBELL & ZELL COMPANY, OF SAME PLACE.

STEAM-BOILER.

SPECIFICATION forming part of Letters Patent No. 437,274, dated September 30, 1890.

Application filed August 5, 1890. Serial No. 361,070. (No model.)

*To all whom it may concern:*

Be it known that I, ROBERT R. ZELL, a citizen of the United States, residing at Baltimore, in the State of Maryland, have invented a certain new and useful Improvement in Steam-Boilers, of which the following is a specification.

The object of my invention is to provide a new and improved steam-generator in which the circulation is continuous and the generation of steam rapid.

My invention consists of certain features hereinafter described, and specifically pointed out in the claims.

The drawing represents a vertical central section of my improved boiler.

Similar letters indicate similar parts throughout the drawing.

A represents a vertical cylindrical steam and water chamber resting upon a base B.

C represents an annular steam and water chamber surrounding the chamber A near its upper end, the lower plate D and the upper plate E of which are riveted to the chamber A at points H H.

As shown in the drawing, F represents an equalizing-pipe connecting the upper and lower ends of the chamber A and is provided with the usual gage-cocks G.

H' represents the steam-dome, from which the steam is carried off by the pipe H².

I represents a feed-water pipe which passes through the lower plate of the chamber A and feeds the boiler with water at about the center of the chamber A. The feed-water, passing through the pipe I, which is surrounded by the hot water in the chamber A, thus becomes heated before entering the boiler.

J represents a "blow-off" pipe by which the sediment deposited in the bottom of chamber A may be blown off from time to time, or the boiler emptied in case of repairs.

K represents a grate around the chamber A, to which fuel is fed through the door K'.

L represents a deflector attached to the chamber A for deflecting the products of combustion among the tubes b, which connect the chamber A and the chamber C and extend entirely around the chamber A, and are expanded at their upper ends in the lower plate D.

M represents an upper deflector, which, together with the lower deflector L, causes the products of combustion to take a serpentine course and thus effectually give out their heat to all parts of the boiler. Without the deflector the flame would ordinarily "slide up," as it were, the sides of the chamber A, and not give up its heat; but by means of these deflectors the flame envelops and comes in direct contact with all parts of the heating-surface.

$d\ d$ represent perforations in the upper part of the chamber A, through which the water in the chamber C passes to the chamber A.

$e\ e$ represent perforations in the chamber A above the perforations $d$. The steam-generated in the chamber C passes to the steam-dome through these perforations $e$, which throw back the water held in suspension by the steam passing from chamber C to the steam-dome H', and thus act as steam-separators.

That part of the chamber A in which are located the perforations $d$ and $e$ is surrounded by the chamber C.

N represents a casing entirely surrounding the boiler, and N' represents the flue through which the products of combustion pass off to the atmosphere.

The circulation of the above-described boiler is perfect. The products of combustion enveloping the tubes $b$ impart heat to water in the tubes which creates a circulation of water from the chamber A to the chamber C and then back to chamber A through perforations $d$ to take the place of the water drawn from the said chamber through the tubes $b$. A rapid circulation is thus produced and any impurities in the water thus rapidly circulating are precipitated to the bottom of chamber A. The normal water-line is between the perforations $d$ and $e$, as shown.

I do not wish to confine myself to the exact construction shown in the drawing, as the same may be varied by one skilled in the art.

Having thus described my invention, what I claim as new is—

1. In a steam-generator having the necessary co-operating parts, the combination, with a main steam and water chamber having perforations below and above its normal water-line, of a steam and water chamber inclosing said perforations, the lower perforations being conduits for the circulation of water between the two chambers, and the upper perforations passages for the steam to the steam-space of the main chamber, substantially as set forth.

2. In a steam-generator having the necessary co-operating parts, the combination, with a cylindrical main steam and water chamber having perforations below and above its normal water-line, of an annular steam and water chamber inclosing said perforations, the lower perforations being conduits for the circulation of water between the two chambers, and the upper perforations passages for the steam to the steam-space of the main chamber, substantially as set forth.

3. The combination, in a steam-boiler, with a main steam and water chamber having perforations below and above its normal water-line, of a chamber surrounding a portion of the main chamber and inclosing said perforations, the lower perforations being conduits for the circulation of the water between the two chambers, the upper perforations passages and separators for the steam passing to the steam-space of the main chamber, and lower water-connections between the two chambers, substantially as set forth.

4. In a steam-boiler, the combination, with a main steam and water chamber, of a surrounding steam and water chamber, lower and upper water-connections between the two chambers, and steam-passages between the said chambers, located above the upper water-connections, the said steam and upper water connections consisting of perforations inclosed by the surrounding chamber, substantially as set forth.

5. In a steam-boiler, the combination, with a main steam and water chamber, of a surrounding steam and water chamber, and lower and upper water-connections between said chambers, the upper water-connections consisting of perforations between the two chambers, inclosed by the said surrounding chamber, substantially as set forth.

6. In a steam-boiler, the combination, with a main steam and water chamber, of a surrounding steam and water chamber, upper and lower water-connections between said chambers, and steam-connections between said chambers, consisting of perforations inclosed by the surrounding chamber, substantially as set forth.

7. The combination, in a steam-boiler, with a main steam and water chamber A, of a surrounding steam and water chamber C, tubes b, forming lower water-connections between the said chambers, perforations d d, forming upper water-connections between the two chambers, and perforations e e, forming steam-connections between the steam-spaces of the said chambers, said perforations being inclosed by the surrounding steam and water chamber, substantially as set forth.

8. The combination, in a steam-boiler, with a steam and water chamber A, of a surrounding steam and water chamber C, tubes b, forming lower water-connections between the said chambers, perforations d d, forming upper water-connections between the two chambers, perforations e e, forming steam-connections between the steam-spaces of the said chambers, said perforations being inclosed by the surrounding steam and water chamber, and the deflectors L and M, for deflecting the products of combustion, substantially as set forth.

9. In a steam-boiler, the combination, with a vertical steam and water chamber or drum A, of a surrounding steam and water chamber C, where lower plate D is flanged and riveted at its inner edge, as at H, to the drum A and flanged and riveted at its outer edge to the head E, which is flanged and riveted to the drum A at H, the perforations d and e in the shell of the drum A between the upper and lower heads of the chamber C, said perforations being respectively upper water and steam connections between said chambers, and the tubes b, forming the lower water-connections, substantially as set forth.

10. The combination, in a steam-boiler, with a main steam and water chamber A, of a surrounding steam and water chamber C, tubes b, forming lower water-connections between the said chambers, perforations d d, forming upper water-connections between the two chambers, perforations e e, forming steam-connections between the steam-spaces of the said chambers, said perforations being inclosed by the surrounding steam and water chamber, and a casing substantially inclosing said boiler, whereby the products of combustion on their way to the stack superheat the steam in the steam-dome, substantially as set forth.

11. The combination, in a steam-boiler, with a main steam and water chamber A, of a surrounding steam and water chamber C, tubes b, forming lower water-connections between the said chambers, perforations d d, forming upper water-connections between the two chambers, perforations e e, forming steam-connections between the steam-spaces of the said chambers, said perforations being inclosed by the surrounding steam and water chamber, and a feed-water pipe entering said main chamber and terminating above the point where the tubes b are connected to the main chamber, substantially as set forth.

ROBERT R. ZELL.

Witnesses:
I. VERNON CAMPBELL,
JAS. B. EVANS.